Nov. 6, 1962     R. L. ERICKSON     3,062,329

DISC BRAKE MECHANISM

Filed Oct. 3, 1960     3 Sheets-Sheet 1

INVENTOR
ROBERT L. ERICKSON
BY
Lowell & Henderson
ATTORNEYS

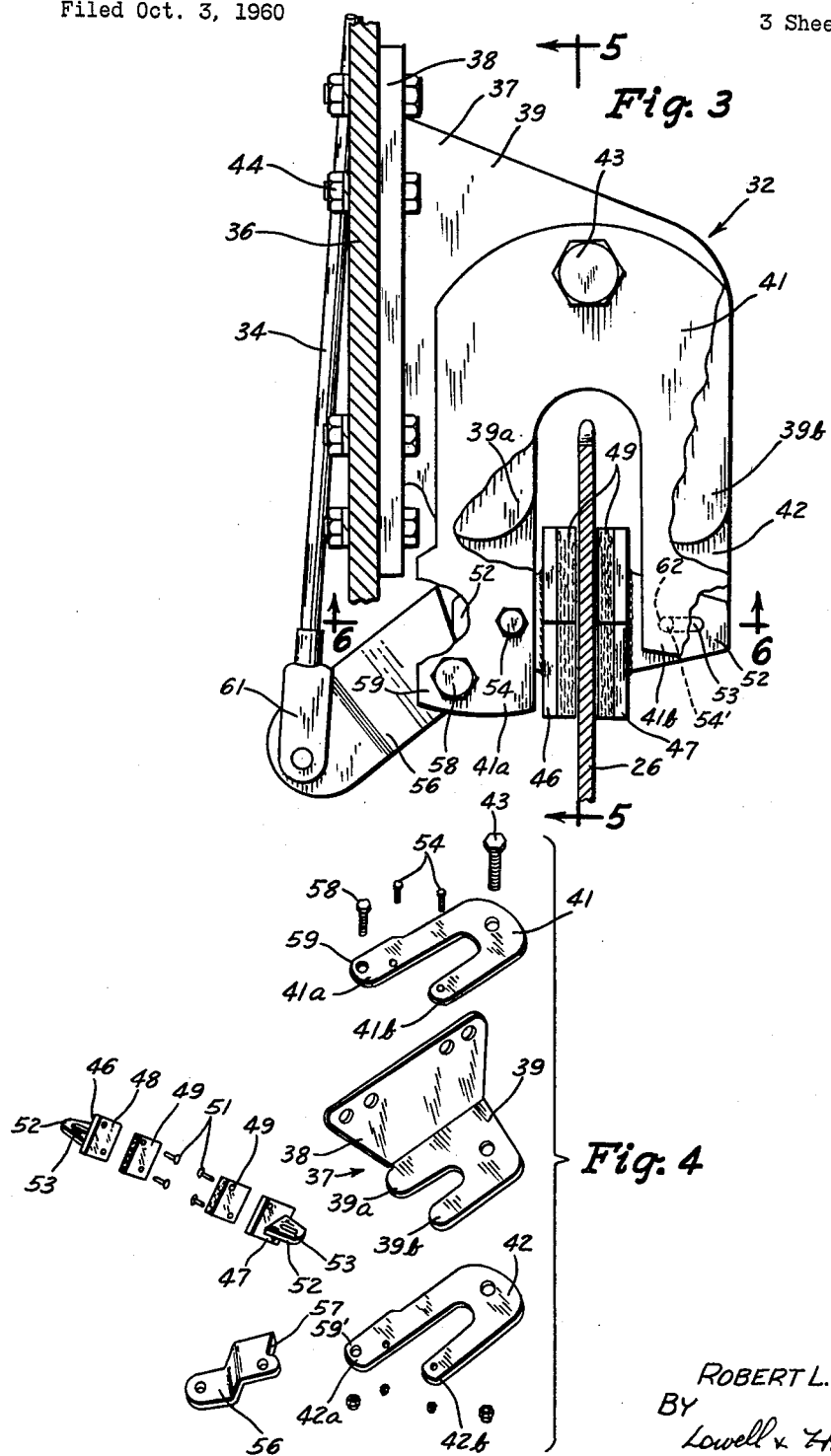

Nov. 6, 1962 R. L. ERICKSON 3,062,329
DISC BRAKE MECHANISM
Filed Oct. 3, 1960 3 Sheets-Sheet 3
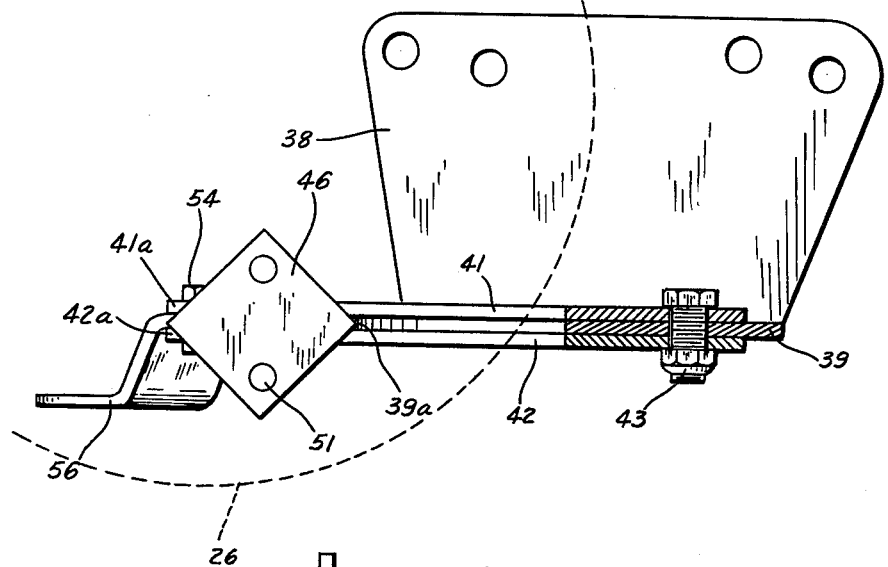
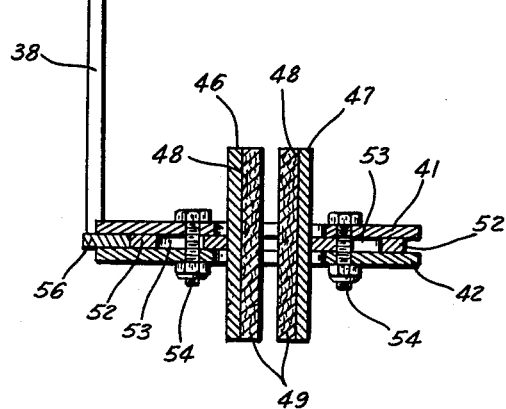
INVENTOR
ROBERT L. ERICKSON
BY
*Lowell x Henderson*
ATTORNEYS 3,062,329
Patented Nov. 6, 1962

3,062,329
DISC BRAKE MECHANISM
Robert L. Erickson, Des Moines, Iowa, assignor to C. E. Erickson Co., Inc., Des Moines, Iowa, a corporation of Iowa
Filed Oct. 3, 1960, Ser. No. 60,022
4 Claims. (Cl. 188—73)

This invention relates generally to automotive vehicles and more particularly to brake mechanisms therefor.

In the manufacturing of midget racing and sport vehicles of the type disclosed herein, wherein power from a rear mounted engine is transmitted via a chain drive to a sprocket gear mounted on the rear axle, braking of the vehicle is often accomplished by a brake mechanism of the English type wherein a brake pressure is applied to both sides of the sprocket gear. This type of brake mechanism, however, has the disadvantage in that should the sprocket gear not run true, or has or develops a wobble or lateral type displacement, the application of brake pressure equally on both sides of the sprocket gear is virtually impossible.

It is an object of this invention to provide an improved brake mechanism.

Another object of this invention is to provide a brake mechanism for applying equal pressure on both sides of a rotatable disc, such as a sprocket gear, irrespective of whether or not the disc runs true.

A further object of this invention is to provide a brake mechanism wherein a pair of opposed braking elements mounted on opposite sides of a rotatable disc or the like for engagement therewith are mounted for simultaneous pivotal and linear movement in the same plane relative to each other and to the disc.

These objects and other features and advantages of this invention will become readily apparent upon reference to the following description when taken in conjunction with the accompanying drawings, wherein:

FIG. 3 is an enlarged fragmentary top plan view of the brake mechanism, with some parts shown in section and others broken away for illustrative purposes;

FIG. 4 is an exploded perspective view of the brake mechanism;

FIG. 5 is a sectional view taken along the line 5—5 in FIG. 3, showing a portion of the sprocket gear in dotted lines; and FIG. 6 is a sectional view taken along the line 6—6 in FIG. 3 with the sprocket gear deleted for illustrative clarification.

Figure 1:
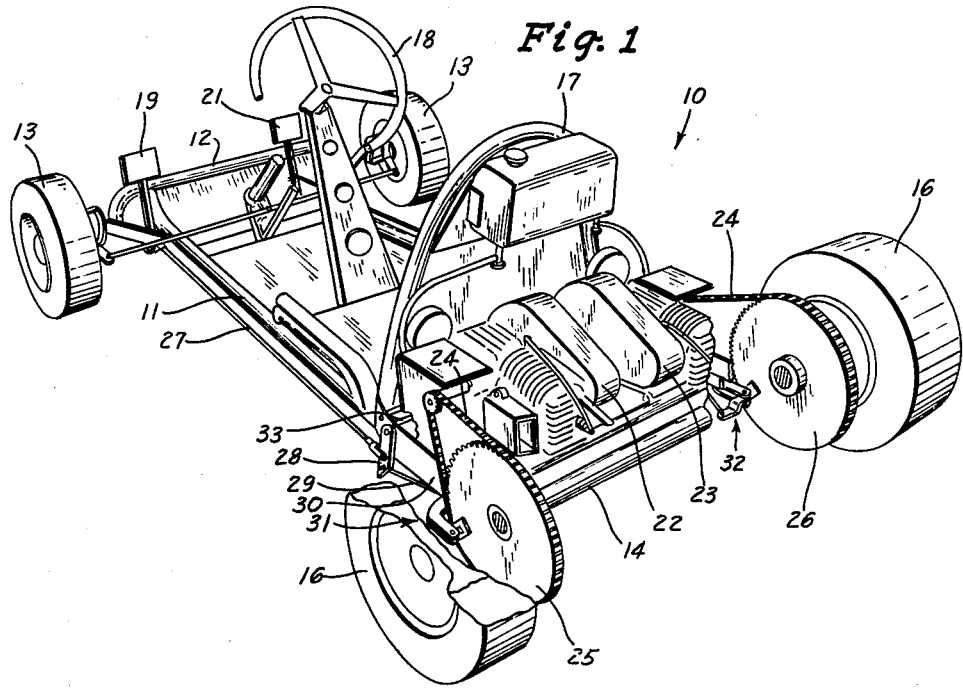
FIG. 1 is a perspective view from the left rear of a midget racing vehicle embodying the present invention, and with certain parts broken away for the purpose of clarity.

Referring now to the drawings, a midget racing vehicle is illustrated generally at 10 in FIG. 1 and comprises a chassis 11 including a front axle 12 for a pair of front wheels 13 and a rear axle 14 for a pair of rear wheels 16. From a seat 17 provided therefor, the driver operates the vehicle 10 by means of a steering wheel 18, a foot brake pedal 19 and a foot throttle pedal 21.

The throttle pedal 21 is connected by linkage to a pair of air cooled engines 22 and 23 mounted on the chassis 11 behind the seat 17, each engine having its output shaft connected by a chain drive 24 to respective sprocket gears 25 and 26. The sprocket gears are securely mounted on the rear axle 14, each adjacent a rear wheel 16. Although a pair of engines are illustrated, it should be understood that some vehicles 10 only have one engine.

Figure 2:
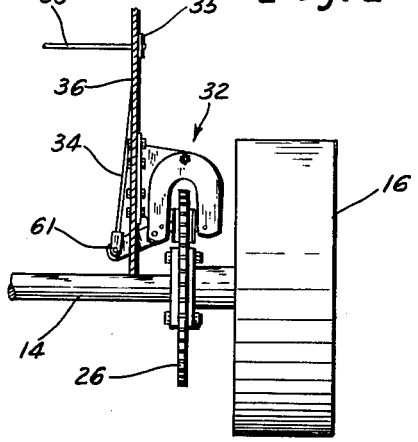
FIG. 2 is a fragmentary top plan view of the right rear wheel area of the vehicle wherein the brake mechanism of this invention is mounted.

The brake system includes a brake rod 27 (FIG. 1) connected at one end to the brake pedal 19 and extended alongside the left side 30 of the chassis 11 to a crank arm 28 pivotally mounted thereon and rearwardly of the seat 17. From the crank arm 28, a short brake rod 29 extends rearwardly underneath the chassis to a connection with a left rear brake mechanism 31. To operate a right rear brake mechanism 32 provided for braking the right sprocket gear 26, a rock shaft 33 (FIG. 1) extends across the chassis 11 behind the seat 17 and interconnects the crank arm 28 with another crank arm 35 (FIG. 2) on the right side 36 of the chassis 11. Connected to and extended rearwardly from the crank arm 35, is a short brake rod 34 (FIGS. 2 and 3) which is comparable to the short brake rod 29. Thus, upon a downward depressing movement of the brake pedal 19, the brake rod 27 is pulled forward and pivots the crank arms 28 and 35, the latter via the cross rod 33, clockwise (FIG. 1), with the short brake rods 29 and 34 being pulled forwardly and toward the front of the vehicle 10.

As both the left and right brake mechanisms 31 and 32, respectively, to which the short brake rods 29 and 34 are connected, are substantially identical, only the right brake mechanism 32 will be described, with like parts indicated by like reference numerals. Referring particularly to FIGS. 3-6, the right brake mechanism 32 comprises a right angular support bracket 37 one leg 38 of which is adapted to be mounted on the chassis right side 36, and the other leg 39 of which is flat and U-shaped and extends horizontally outwardly from the chassis 11. A pair of flat U-shaped equalizer plates 41 and 42 (FIG. 5) are pivotally mounted above and below, respectively, the support bracket leg 39 by a pivot bolt 43 inserted through the bases of the plates 41 and 42 and the leg 39.

By aligning the respective legs 41a and 41b, and 42a and 42b of the plates 41 and 42, with the legs 39a and 39b of the support bracket leg 39, it is readily seen that upon securing the support bracket 37 to the chassis right side 36 (FIG. 3) as by bolts and nuts 44, the legs of the plates 41 and 42 straddle and are disposed on both sides of the right sprocket gear 26, and below the rear axle 14 (FIG. 1). Also, the equalizer plates 41 and 42 are pivotally movable in a horizontal plane normal or perpendicular to the vertical plane in which the sprocket gear 26 is disposed.

For frictionally engaging the sides of the sprocket gear 26, a pair of brake shoes 46 and 47 (FIGS. 3 and 6) are provided, each having a flat portion 48 extended in a plane parallel to that of the sprocket gear 26 and with a brake lining pad 49 attached thereto by rivets 51. Each brake shoe is also provided with a flat arm extension 52 extended at right angles to the portion 48 (FIG. 3) and having a slot 53 formed therein.

The flat arm extensions 52 are each inserted between a respective pair of vertically spaced and aligned legs 41a and 42a, and 41b and 42b of the equalizer plates 41 and 42, and are pivotally connected therebetween by pivot bolts 54. As the pivot bolts 54 are inserted through the vertically aligned legs of the actuator plates 41 and 42, these plates are thereby connected together for movement as a unit. However, as the pivot bolts 54 pass through the slots 53 (FIG. 6) in the brake shoe extensions 52, it is readily seen that this arrangement provides for the brake shoes 46 and 47 being pivotally movable relative to each other and to the sprocket gear 26, and also movable laterally toward and away from each other and from the sprocket gear 26.

For actuating the right brake mechanism 32, an actuating arm 56 of an irregular shape and having a cam surface 57 (FIG. 4) is pivotally connected at one end by a pivot bolt 58 between the inner corners 59 and 59' of the legs 41a and 42a. The other end of the arm 56 is pivotally connected to the rear yoke end 61 of the brake rod 34. Thus, upon forward movement of brake rod 34, the actuating arm 56 (FIG. 3) is moved clockwise and forces the cam surface 57 up against the adjacent brake shoe 46. As the pad 49 of the brake shoe 46 is forced against the adjacent side of the sprocket gear 26, continued pivotal movement of the actuator arm 56 results in the equalizer plates 41 and 42 pivoting slightly as a unit in a clockwise direction, as viewed in FIG. 3, and thus pressing the other brake shoe 47 against the sprocket gear, the action thus resulting in an application of equal pressure on both sides of the sprocket gear 26.

Should the sprocket gear 26 wobble slightly and not run true, not only can each brake shoe 46 and 47 pivot relative to each other to accommodate the irregularity, but also both shoes can move laterally of the sprocket gear, with both the pivotal and lateral (or linear) movements of the brake shoes 46 and 47 being in a horizontal plane normal to the perpendicular plane of the sprocket gear 26.

For example, referring particularly to FIG. 3, assuming the sprocket gear 26 to have a slight wobble to the right of the true vertical plane of rotational movement and assuming the brake mechanism 32 is applied, as the high side (not shown) of the gear 26 rotates toward and against the right brake shoe 47 this shoe is forced to the right from that position illustrated in FIG. 3. This movement of the shoe 47, due to the inner end 62 of the slot 53 engaging the corresponding pivot bolt shank 54' which secures the legs 41b and 42b, in turn forces the equalizer plates 41 and 42 as a unit in a counterclockwise direction about the pivot bolt 43. As the plates 41 and 42 pivot counterclockwise, it may be seen that the actuating arm 56, held under constant pressure by the driver, is also moved therewith, thus forcing the left brake shoe 46 to the right to maintain its engagement with the gear 26 and to compensate for the right wobble of the gear 26 which momentarily moved the gear 26 out of engagement with the shoe 46.

Then, as the high side passes by the right brake shoe 47, the left brake shoe 46 is forced to the left in its slot 53 (FIG. 6). However as it is in engagement with the actuator arm 56, this movement is transmitted to the equalizer plates 41 and 42 whereby they pivot clockwise and bring the right brake shoe 47 to bear against the sprocket gear 26.

As equally important as the capability of either brake shoe 46 or 47 to move relative to the equalizer plates 41 and 42, or vice versa, is the additional capability of either or both brake shoes to pivot relative to each other and to the gear 26 in a plane normal to the gear. Thus, as the gear wobbles to the right as described hereinbefore, while one or both shoes 46 and 47 are compensating for the wobble by lateral movement, they both can simultaneously compensate for the wobble by pivoting. Referring to FIG. 3, it can readily be seen that should the right brake shoe 47 pivot about its pivot bolt 54 in a clockwise direction due to a wobble of the gear 26, the left brake shoe 46 pivots in a counterclockwise direction, thus maintaining a parallel relationship with each other and with the gear 26 to maintain the equalized pressure thereon.

In summation, the present invention comprises a brake mechanism for applying equal pressure on both sides of a rotatable disc irrespective of whether or not the disc runs exactly true, by means of a pair of opposed brake shoes movably mounted on a pair of pivotally movable equalizer plates, wherein the brake shoes are simultaneously pivotally and laterally movable relative to each other and to the disc in a plane normal to the plane of the disc.

Although a preferred embodiment of the invention has been described herein, it is to be remembered that various modifications and alterations can be made without departing from the full scope of the invention as defined in the appended claims.

I claim:

1. A device for braking a disc rotatably mounted on a frame comprising, a support means, means for mounting said support means on the frame, equalizer means including a pair of U-shaped members, means pivotally mounting said U-shaped members in spaced relation at their bases to said support means so that the legs thereof straddle the disc, a pair of brake shoes having portions extended between said legs on each side of the disc, means movably connecting said portions to said legs for pivotal and linear movement relative to each other in a plane normal to the disc, actuator means, and means pivotally mounting said actuator means on said equalizer means for movement into engagement with one of said brake shoes to move both brake shoes against the disc.

2. A device for braking a disc rotatably mounted on a frame comprising a support means, means mounting said support means on the frame, equalizer means including relatively fixed leg portions on each side of the disc, means pivotally mounting said equalizer means on said support means, a pair of brake shoes one on each side of the disc and having lining elements adapted to engage the sides of the disc, each of said brake shoes having a projection formed with an elongated slot extended normal to the disc, pivot means inserted through the slot of each brake shoe to connect the brake shoe to a corresponding leg portion, whereby said brake shoes are mounted for pivotal and linear movement relative to each other in a plane normal to the disc, actuator means, and means pivotally mounting said actuator means on said equalizer means, said actuator means having a cam surface movable into engagement with one of said brake shoes to move said one brake shoe against the disc, whereby both brake shoes engage the disc with equal pressure.

3. A device for braking a disc rotatably mounted on a frame comprising, a pair of brake shoes one on each side of the disc for engagement therewith, said brake shoes each including a portion formed with an elongated slot extended normal to the plane of the disc, a pivot means extended through each slot in a plane parallel to said disc whereby said brake shoes are movable both toward and away from each other and are also pivotal relative to each other in a plane normal to the disc, actuating means having a cam surface operable to engage and move one of said brake shoes into engagement with said disc, a support means, means mounting the support means on said frame, equalizer means pivotally mounted on said support means, said pivot means being supported on said equalizer means, and means pivotally connecting said equalizer means to said actuating means, with said cam surface, on movement about the pivotal connection of said actuating means, engaging and moving said one brake shoe into engagement with the disc, whereby said equalizer means moves said other brake shoe into engagement with the disc.

4. A device for braking a disc rotatably mounted on a frame comprising, a support bracket mounted on the frame and including a flat U-shaped member the legs of which straddle the disc, a pair of substantially flat U-shaped plate elements arranged parallel to and on opposite sides of said member with the legs thereof in a straddling relation with the disc, a common means pivotally connecting the base portions of said plate elements to the base portion of said member, a pair of brake shoe elements each having a flat arm portion extended between a corresponding pair of legs of said plate elements, a pivot pivotally connecting each arm portion to a corresponding pair of said legs, each arm portion having an elongated slot formed therein extended normal to said disc and through which said pivot extends whereby the brake shoe elements are movable toward and away from each other, each brake shoe element adapted to engage a side of the disc, an actuating arm extended between one of said corresponding pairs of legs, said actuating arm having a portion engageable with one of said shoe elements so that on pivotal movement of said actuating arm in one direction said shoe elements are moved into engagement with the disc, and means pivotally connecting said actuating arm to said one pair of corresponding legs.

References Cited in the file of this patent

FOREIGN PATENTS 598,750     Great Britain _____ Feb. 25, 1948